June 15, 1965     E. K. HANSEN     3,189,202
MATERIAL UNLOADING VEHICLE
Filed Aug. 22, 1961     7 Sheets-Sheet 1
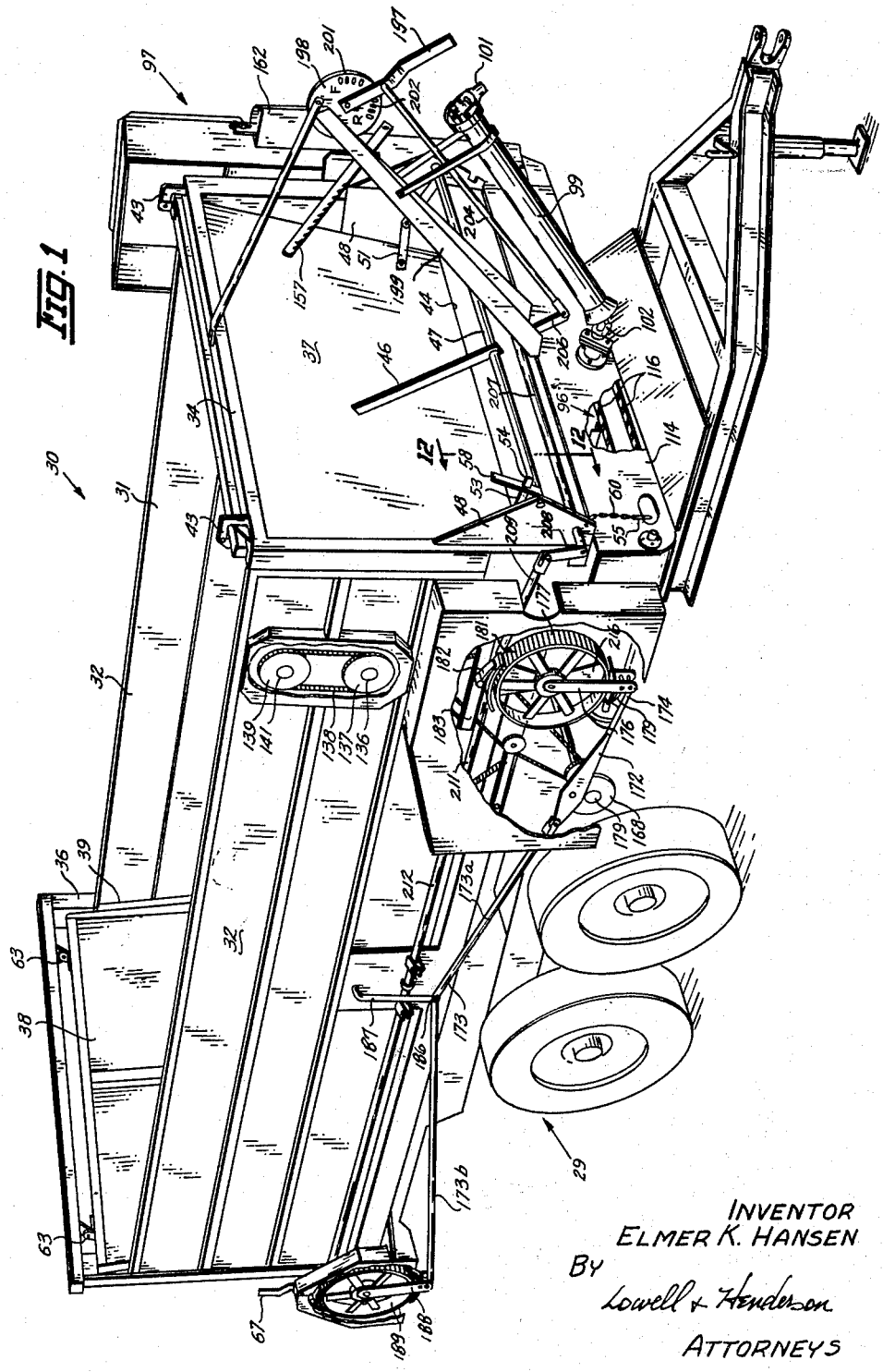
INVENTOR
ELMER K. HANSEN
By
Lowell & Henderson
ATTORNEYS

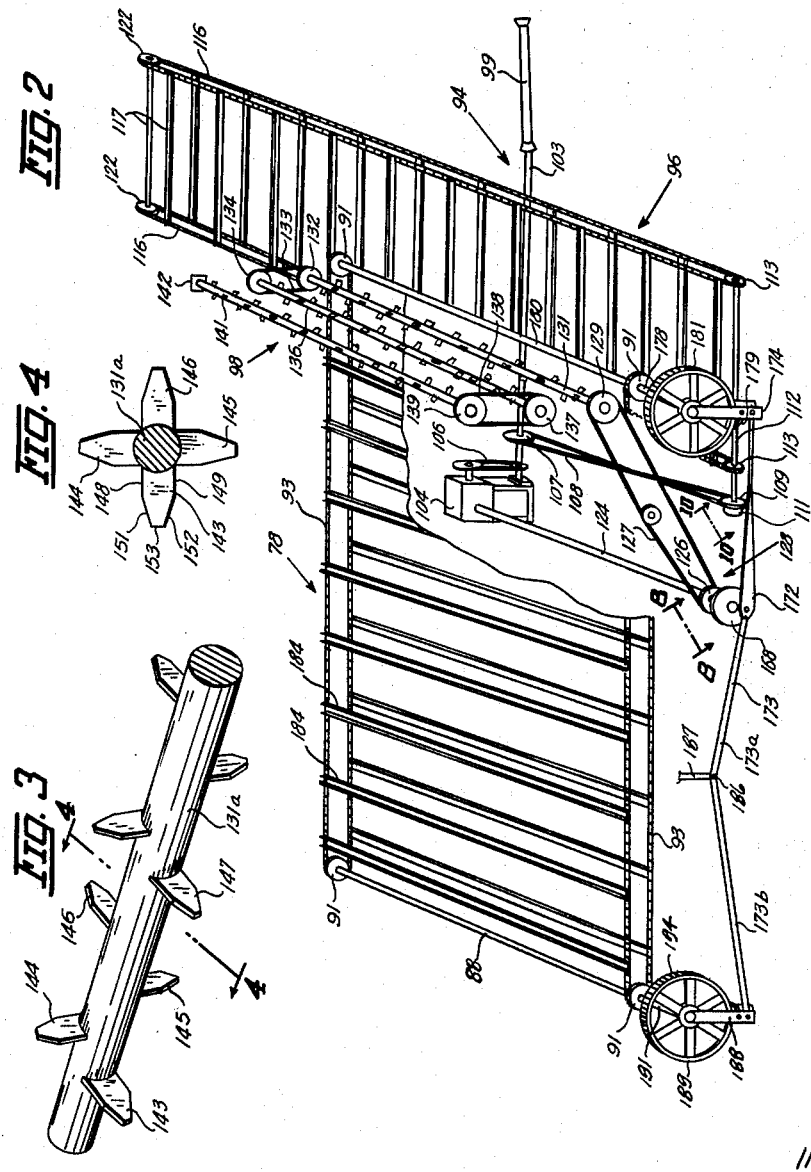

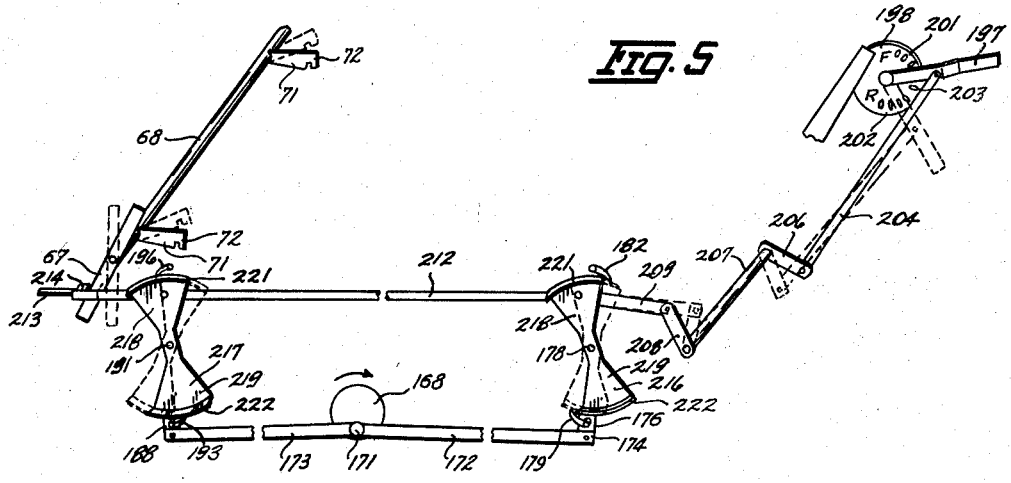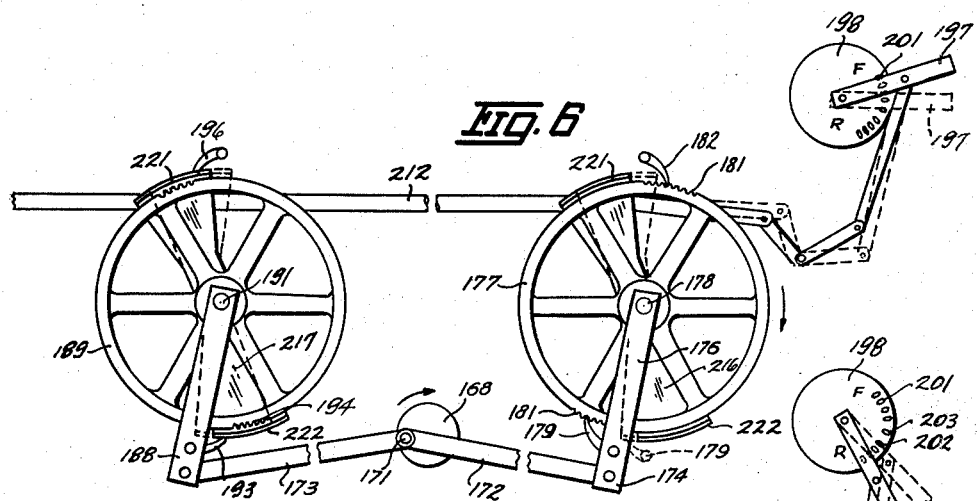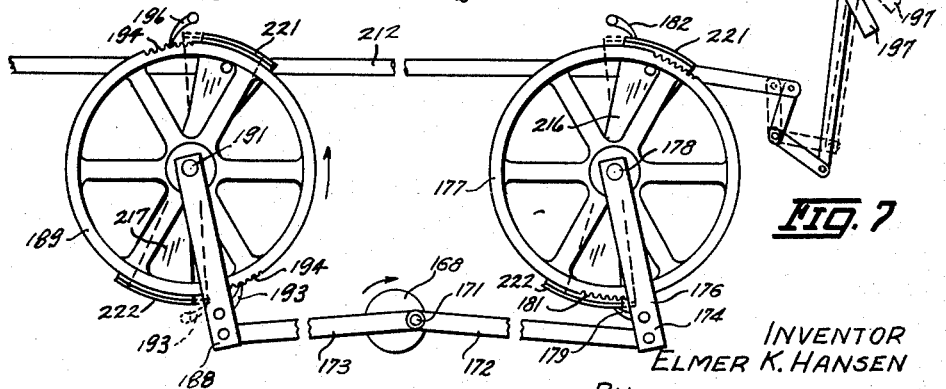

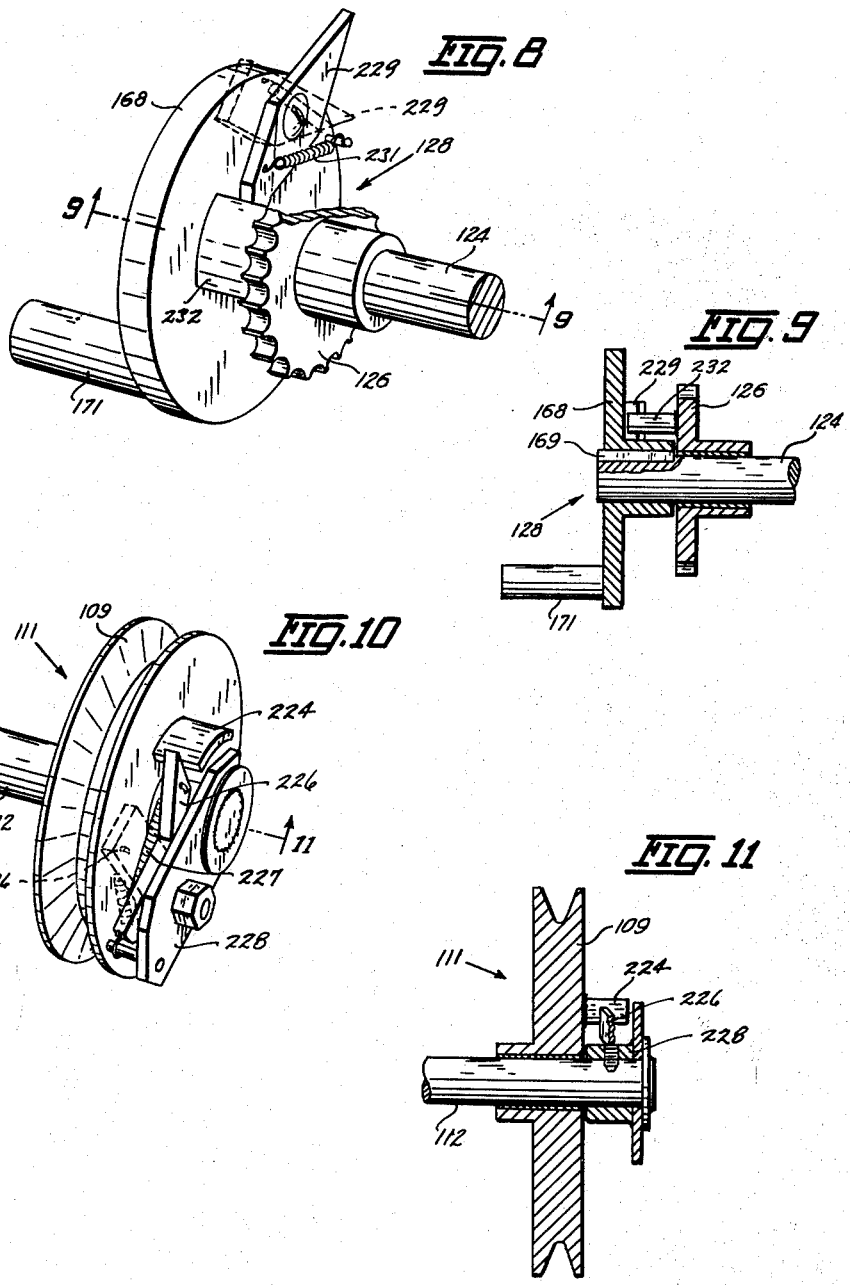

June 15, 1965 E. K. HANSEN 3,189,202
MATERIAL UNLOADING VEHICLE
Filed Aug. 22, 1961 7 Sheets-Sheet 5
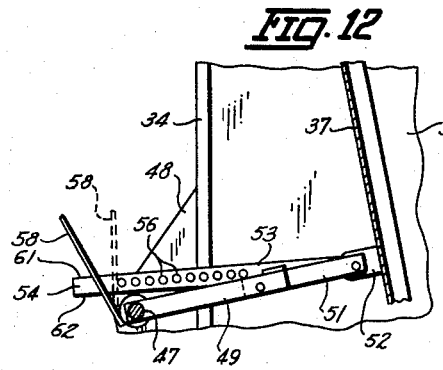
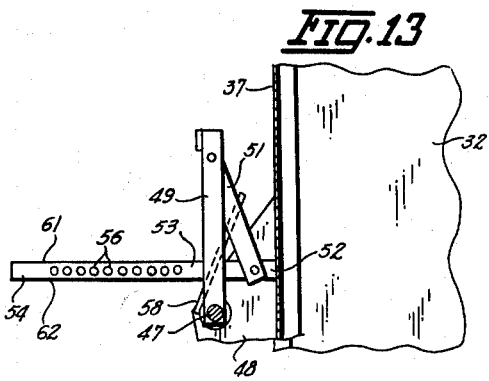
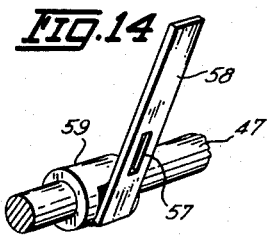
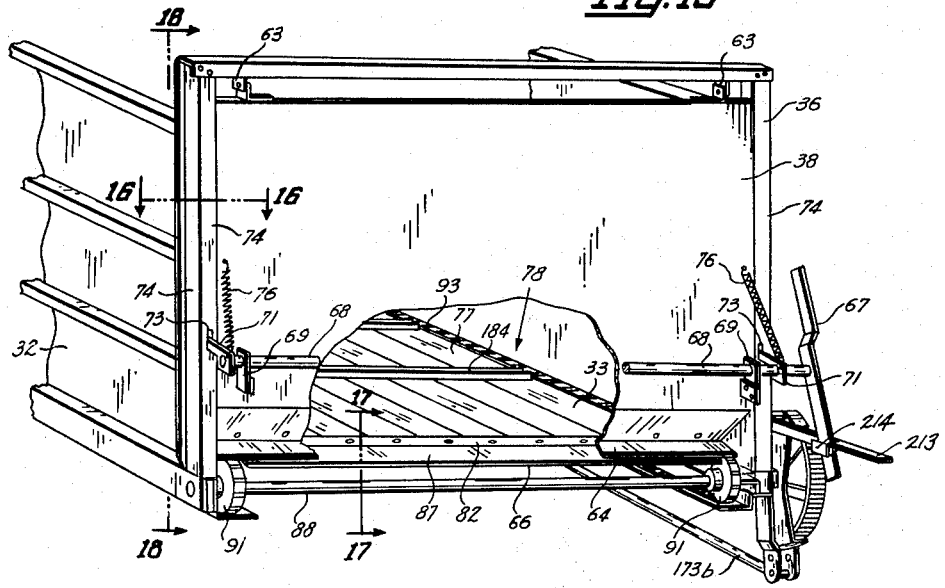
INVENTOR
ELMER K. HANSEN
BY
*Lowell K. Henderson*
ATTORNEY

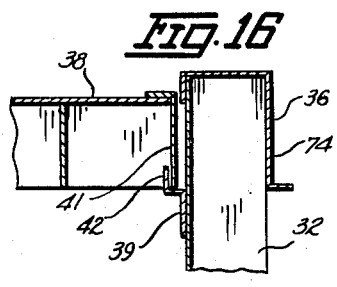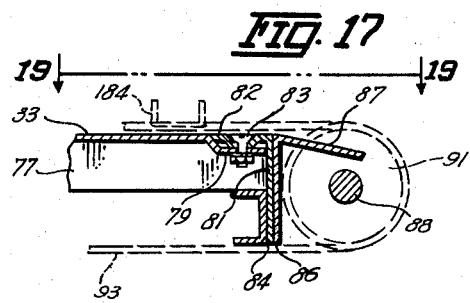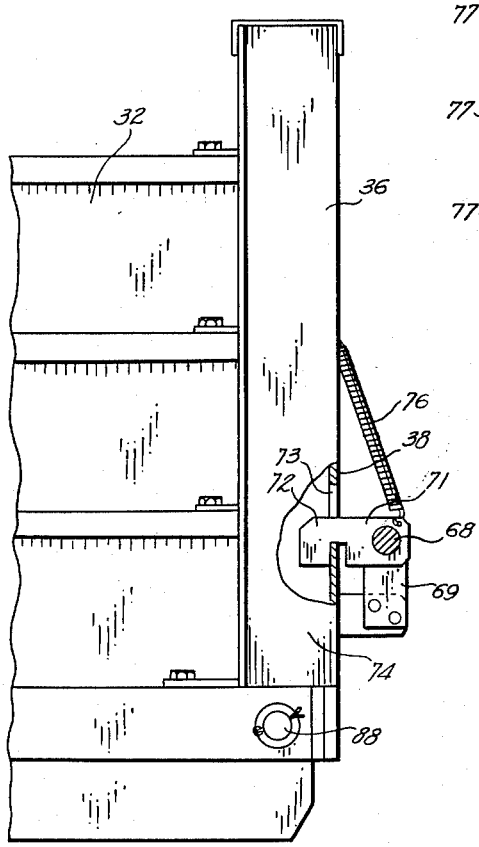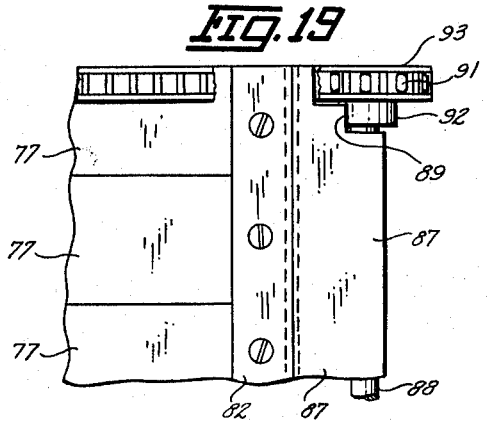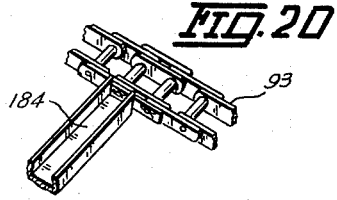

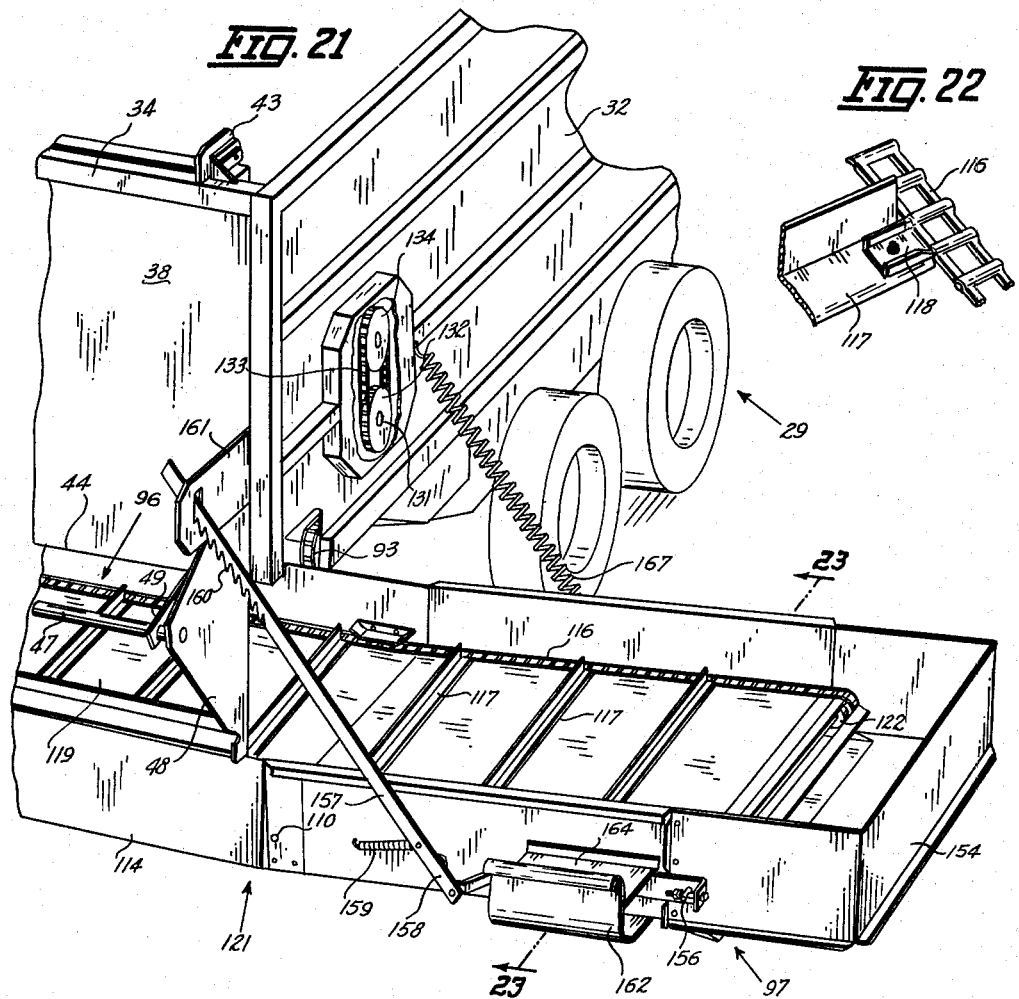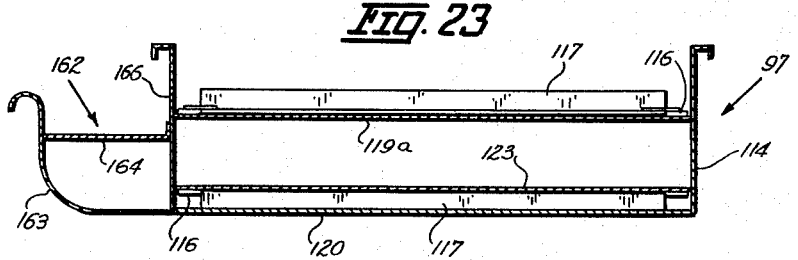

United States Patent Office 3,189,202
Patented June 15, 1965

3,189,202
MATERIAL UNLOADING VEHICLE
Elmer K. Hansen, 3100 Correctionville Road,
Sioux City 5, Iowa
Filed Aug. 22, 1961, Ser. No. 133,208
4 Claims. (Cl. 214—83.36)

This invention relates generally to material handling apparatus and more particularly to a material unloading vehicle for use in unloading grain, ground livestock feed, and similar material into hoppers, feed bins and the like.

An object of this invention is to provide an improved material unloading vehicle.

A further object of this invention is to provide a material unloading vehicle which is operable to unload granular material continuously and at a controlled rate to a bin or feeding device.

Another object of this invention is to provide a material unloading vehicle which is operable to unload granular material at either end of the vehicle by utilizing a reversible bed conveyor.

Yet another object of this invention is to provide a material unloading vehicle adapted to selectively unload by conveying means from either one of two end gates at opposite ends of the vehicle, with mechanism which automatically unlocks one end gate upon operation of the conveying means to move material toward that end gate.

A further object of this invention is to provide a material unloading vehicle having ends gates at opposed ends thereof with a reversible longitudinal conveyor for conveying material toward either end gate, and with a cross or transverse conveyor unit adjacent one end gate for discharging the material to one side of the vehicle.

Another object of this invention is to provide a material unloading vehicle of the type characterized hereinbefore with an improved agitating device for associaton with the cross conveyor unit.

Yet another object of this invention is to provide a material unloading vehicle of the type characterized hereinbefore with a novel clutch arrangement for disengaging the agitating device and the cross conveyor unit when the longitudinal conveyor is operated to move material toward the end gate opposite the end of the vehicle where the agitating device and cross conveyor unit are mounted.

A further object of this invention is to provide a material unloading vehicle of the type characterized hereinbefore with a novel friction lock for securely locking one of the end gates in a predetermined position.

Another object of this invention is to provide a material unloading vehicle having a cross conveyor with a vertically swingable elevator bunk for material discharging purposes, and wherein the bunk has a skid device attached thereto to aid in preventing damage to the bunk.

Yet another object of this invention is to provide a material unloading vehicle of the type characterized hereinbefore which is simple in construction, economical in cost, and efficient in operation.

Further objects, features and advantages of this invention will become apparent from a consideration of the following description when taken in connection with the accompanying drawing in which:

FIG. 1 is a perspective view of the material unloading vehicle of this invention, with some parts broken away for the purpose of clarity;

FIG. 2 is a perspective schematic view of the driving and conveying mechanism of the vehicle, with some parts broken away for clarity;

FIG. 3 is an enlarged, fragmentary perspective view of an agitator shaft for the vehicle;

FIG. 4 is a sectional view taken along the line 4—4 in FIG. 3;

FIG. 5 is a perspective schematic view of the control linkage for the longitudinal conveyor, and showing an unlatching device as a part thereof for the rear end gate of the vehicle;

FIGS. 6 and 7 are enlarged schematic views of a portion of the FIG. 5 linkage shown applied to the sprocket wheels for the longitudinal conveyor, FIG. 5 showing relative positions of parts for forward movement of the conveyor and FIG. 6 showing the same for reverse movement thereof;

FIG. 8 is an enlarged, fragmentary perspective view of a clutch unit for the agitator, as viewed along the line 8—8 in FIG. 2;

FIG. 9 is a sectional view taken along the line 9—9 in FIG. 8;

FIG. 10 is an enlarged, fragmentary perspective view of a clutch unit for the cross conveyor, as viewed along the line 10—10 in FIG. 2;

FIG. 11 is a sectional view taken along the line 11—11 in FIG. 10;

FIG. 12 is an enlarged, fragmentary side elevational view as viewed along the line 12—12 in FIG. 1, and showing a friction lock for the front end gate;

FIG. 13 is a view similar to FIG. 12 and wherein the front end is locked in an open position;

FIG. 14 is a detail perspective view of a lock catch element of the friction lock;

FIG. 15 is a fragmentary perspective view of the rear of the vehicle, with certain parts broken away for clarity;

FIG. 16 is a sectional view taken along the line 16—16 in FIG. 15;

FIG. 17 is a sectional view taken along the line 17—17 in FIG. 15;

FIG. 18 is a fragmentary side elevational view as viewed along the line 18—18 in FIG. 15, with certain parts broken away for clarity;

FIG. 19 is a fragmentary plan view as viewed along the line 19—19 in FIG. 17;

FIG. 20 is a fragmentary detail perspective view of a portion of the longitudinal conveyor chain and flight;

FIG. 21 is a fragmentary perspective view of the vehicle showing the elevator bunk held in a lowered position;

FIG. 22 is an enlarged detail perspective view of a portion of the cross conveyor chain and flight; and FIG. 23 is a sectional view taken along the line 23—23 of FIG. 21.

Referring now to the drawings, the material unloading vehicle of this invention, indicated generally at 30 in FIG. 1, comprises a material container 31 of a box type, mounted on a wheeled frame 29, and having side walls 32, a bottom wall 33 (FIG. 15), and front and rear arches or frames 34 and 36, respectively, on which front and rear end gates 37 and 38, respectively, are hung.

To provide a tight seal for the gates 37 and 38 when they are in a closed position relative to the interior of the container 31, a transversely opposed pair of S-shaped sealing members 39 (FIGS. 1 and 16) is secured on the inner surface of the side walls 32 adjacent each end of the container 31. As viewed in FIG. 16, an inwardly extended flange 41 provided at each end of each gate 37 and 38 is adapted upon a closing of a gate to nest within a sealing member 39, extending between a flange 42 thereof and a side wall 32.

The front gate 37 (FIG. 1) is pivotally connected to a pair of brackets 43 mounted on the frame 34, and is movable between an open position and a closed position where the lower edge 44 (FIG. 1) of the front gate 37 is either spaced from the front end (not shown) of the bottom wall 33 or is closed thereagainst. To open and close the front gate 37, a manually operable lever 46 (FIG. 1) is provided, which is secured to a rod 47 journaled at its ends in a pair of brackets 48 provided therefor on the front frame 34. Adjacent each bracket 48, knee-action linkage (FIGS. 12 and 13) is provided, one link 49 being secured to the rod 47 and the other link 51 pivotally connected between the link 49 and a bracket 52 secured to the front gate 37.

To lock the front gate 37 against movement in a predetermined direction, a friction lock is provided which includes an elongated bar 53 (FIGS. 1, 12 and 13) pivotally connected at one end to the bracket 52. The other end 54 of the bar 53, in which a plurality of holes 56 are formed, is inserted through a slot 57 (FIG. 14) formed in a lock arm 58 rotatably mounted by a spool 59 on the rod 47. As the length of the slot 57 is greater than the height or width of the bar 53, when the lock arm 58 is in a generally vertical position (dotted lines, FIG. 12), the bar 53 is freely movable therethrough. Thus, so long as the lock arm 58 is manually held in a generally vertical position, the front gate 37 is freely swingable.

However, upon positioning the lock arm 58 either to the left of vertical, as shown in full lines in FIG. 12, or to the right of vertical, as shown in full and dotted lines in FIG. 13, whereby the effective length of the slot 57, due to the inclination of the slot 57 relative to the bar 53, has diminished so that both upper and lower edges 61 and 62, respectively, of the bar 53 engage the lock arm 58 at the upper and lower extremities of the slot 57, it can readily be appreciated that the bar 53 and the front gate 37 can neither move to the left in FIG. 12, nor to the right in FIG. 13. Furthermore, the action of the friction lock can be automatic as follows. Were the lock arm 58 to be released while in the dotted line position of FIG. 12, and were the front gate 37 to be moved by any means to the left as viewed therein, the friction of the bar 53 passing through the lock arm 58 would rotate the latter to the full line position, thus automatically effecting a locking of the bar 53 by the lock arm 58. To ensure the function of the friction lock, a pin 55 (FIG. 1) secured to the end of a chain 60 is provided for selective insertion in one of the holes 56.

The rear gate 38 (FIG. 15), swingably mounted on pivot brackets 63 secured to the rear frame 36, is also movable from a closed position wherein a rubber door seal 64 is closed against the rear end 66 of the bottom wall 33, to an open position where the seal 64 is spaced from the rear end 66. To lock the rear gate 38 to the container 31 in a closed position, the lever 67 (FIGS. 1, 5, and 15) is provided which is secured at midpoint to one end of an elongated rod 68 journaled in brackets 69 mounted on the rear face of the rear gate 38. A pair of arms 71 are secured to the rod 68, and upon being rotated to a generally horizontal position, the inner hooked end 72 (FIG. 18) of each arm 71 is inserted through a slot 73 (FIGS. 15 and 18), formed in an adjacent post 74 of the rear frame 36, and engages the post 74 at the lower extremity of the slot 73.

To unlock the rear gate 38, the lever 67 is rotated so as to turn the rod 68 and raise the arms 71, thereby disengaging the hooked ends 72 from the post 74. The rear gate 38 can then be swung outwardly and away from the bottom wall 33. A pair of springs 76 (FIGS. 15 and 18) are attached between the rear gate 38 and the outer ends of the arms 71 to bias the arms 71 toward engagement with the post 74.

The bottom wall 33, best illustrated in FIGS. 15, 17, and 19 is comprised of a plurality of longitudinally extended channel-shaped floor members 77 laid side-by-side to provide a flat surface to accommodate a longitudinal conveyor unit, indicated generally at 78 in FIG. 15. At each longitudinal end of the floor members 77, a depression 79 (FIG. 17) is formed, and which extends the entire transverse width of the bottom wall 33. An L-shaped plate 81 is mounted within the depression 79 with an upper flange 82 thereof flush with the remainder of the floor members 77, and which flange 82 is secured to the floor members by a plurality of bolts 83 inserted through countersunk openings formed in the flange 82.

To the rear depending leg 84 (FIG. 17) of the floor connecting plate 81, a guard plate 86 (FIGS. 17 and 19) is secured, with an upper flange 87 extending outwardly toward the rear of the vehicle 30. As the flange 87 extends above and beyond the transverse sprocket shaft 88 (FIG. 17) of the longitudinal conveyor unit 78, it will be appreciated that material moved rearwardly in the container 31 and over the flange 87 does not fall onto the shaft. At each end of the guard plate 86, an irregular relief 89 (FIG. 19) is formed therein to accommodate one of the four sprockets 91 of the longitudinal conveyor unit 78, and an adjacent bearing housing 92. By this arrangement, each of a pair of chains 93 for the unit 78 can travel in reverse directions over and under the bottom wall 33, as driven by the sprockets 91 of the longitudinal conveyor unit 78, hereinafter referred to as the conveyor 78.

The conveyor 78 is a unit of the driving and conveying mechanism for the vehicle 30, which includes additionally to the conveyor 78 (FIG. 2), a power unit 94 for transmitting power from normally the power take-off of a tractor for the vehicle 30, a transverse or cross conveyor unit 96 (FIGS. 1 and 21) for moving material transversely across the front end of the container 31 for side discharge through an elevator bunk 97 (FIG. 21), and an agitator unit 98 (FIG. 2) for mixing the material at the front end of the container 31.

For receiving and transmitting the power take-off drive, a shaft, shielded by a tube 99 (FIG. 1) and having universal joints 101 and 102 at each end is provided at the front of the vehicle. One of the joints is connected to a drive shaft 103 (FIG. 2) which in turn is connected to a gear box 104 via a chain and sprocket unit 106. On the drive shaft 103 is mounted a drive pulley 107 for rotating, via a pulley V-belt 108, a clutch pulley 109 which is part of a clutch unit 111 (FIGS. 2, 10 and 11). When engaged, the clutch unit transmits the drive to a front drive shaft 112 to which a pair of drag drive sprockets 113 are secured in spaced relation.

The front drive shaft 112 is rotatably mounted at one end of an open top, box-like housing 114 (FIGS. 1, 21 and 23) secured transversely across the front end of the container 31 and disposed immediately in front of and below the forward end of the bottom wall 33. Flight chains 116 (FIGS. 1, 21 and 22), mounted on the sprockets 113 and carrying flights 117 (FIG. 23) connected to the chains 116 by attachment links 118, are arranged to travel over an upper pan 119 (FIG. 21) of the housing 114, traveling laterally of the container 31 and toward the outer end 121 (FIG. 21) of the housing 114. The chains 116 extend into the elevator bunk 97 to driving connection with an outer pair of rotatably mounted sprockets 122, and return from the bunk beneath a lower pan (not shown) of the housing 114.

The bunk 97 (FIGS. 21 and 23) is constructed in much the same manner as the housing 114, having an upper pan 119a and a lower pan 123 spaced above a bottom 120 for the chain flights 117 and is pivotally connected at 110 to the end 121 of the housing 114. The outer end 154 of the bunk is an open U-shaped structure which is adjustably mounted on the main bunk structure by devices 156 (only one showing). To position the bunk 97 angularly relative to the cross conveyor unit 96, an adjustment arm 157 is provided, which is pivotally connected at one end 158 to the bunk and biased by a spring 159 counter-clockwise as viewed in FIG. 21. The other end of the arm 157 has teeth 160 formed therein adapted to engage a bracket 161 on the front frame 34 through which the arm 157 extends.

To protect the elevator bunk 97 against damage by being run into objects, a skid 162 (FIG. 23) is provided on the side of the bunk facing the normal direction of travel. The skid includes a member 163 extended outwardly from the bottom 120 of the bunk and curved upwardly toward the top thereof as illustrated (FIGS. 21 and 23). A brace 164 extends between the member 163 and the adjacent side 166 of the bunk for strengthening the member 163. It can readily be seen that should the skid 162 strike an object, it would force the arm 157 upwardly and out of engagement with the bracket 161, thus enabling the bunk 97 to pivot upwardly and away from the object by virtue of the bias of a spring 167 connected between the bunk 97 and a side wall 32 of the container 31.

In conjunction with operation of the cross conveyor 96, the agitator unit 98 (FIG. 2) receives power from a cross drive shaft 124 connected to the gear box 104, via sprocket 126 and chain 127, the sprocket 126 being part of a clutch unit 128 (FIGS. 2, 8, and 9) for the agitator unit 98. The chain 127 rotates a sprocket 129 (FIG. 2) mounted on one end of a lower agitator shaft 131 extended transversely of the container 31 above the front end of the bottom wall 33 and the cross conveyor housing 114. At the other end of the lower agitator shaft 131 (FIGS. 2 and 21), another sprocket 132 is provided and which drives a chain 133 connected to an upper sprocket 134 secured to an end of an intermediate agitator shaft 136.

Drive is thus transmitted back through the intermediate agitator shaft 136, disposed vertically above the lower agitator shaft 131, to another sprocket 137, and upwardly by a chain 138 to another sprocket 139. The sprocket 139 is secured to one end of an upper agitator shaft 141, spaced above the other two shafts 131 and 136, and the other end of which is journaled in a bearing 142 secured to a side wall 32.

Referring to FIGS. 3 and 4, a portion 131a of the lower agitator shaft 131 is illustrated, and as the other shafts 136 and 141 are identical to the shaft 131, this portion 131a is typical. A set of blades 143, 144, 145, and 146 are secured in axially and angularly spaced relation on the shaft portion 131a, there being a plurality of sets arranged side-by-side longitudinally of the shaft 131 so that the spiral pattern of a set is repeated the full length of the shaft 131. It will be noted that blade 144 is axially spaced from the blade 143, and angularly offset approximately 90° therefrom. The next adjacent blade 145, while also being axially spaced from blade 144 a like distance as the 143, 144 spacing is angularly offset approximately 180° from the blade 144. The last blade 146 in the set, also equally spaced from the adjacent blade 145 is offset angularly therefrom approximately 90°.

In continuation, the first blade 147 of the next adjacent set of blades, extended similarly to the blade 143, is offset approximately 180° from the last adjacent blade 146. This 90°, 180°, 90°, 180° pattern is thus repeated the length of each shaft 131, 136 and 141. As viewed transversely in FIG. 4, the blades extend radially from the shaft portion 131a in an X formation for balanced rotation. Each blade, 143 for example, is flat and has straight parallel sides 148 and 149, which converge at 151 and 152 near the squared end 153 of the blade 143.

As mentioned hereinbefore, the driving and conveying mechanism includes the conveyor 78, in conjunction with the cross conveyor unit 96 and the agitator unit 98. The conveyor 78 receives its drive from an eccentric 168 (FIGS. 2, 8 and 9) of the agitator unit clutch 128, which is secured by a key 169 (FIG. 9) to the cross drive shaft 124. From a cam 171 on the eccentric 168, drive is imparted both toward the front of the vehicle 30 and toward the rear thereof by a pair of arms 172 and 173, respectively. The front drive arm 172 is actually pivotally connected to the cam 171, while the rear drive arm 173, comprised of a pair of connector links 173a and 173b, is pivotally connected to the arm 172.

The front drive arm 172 (FIGS. 1 and 2) is pivotally connected at its forward end 174 to the lower end of a front yoke unit 176 pivotally mounted in a straddling relation with a ratchet wheel 177 secured on an extension 178 of the shaft 180 for rotating the conveyor front sprockets 91. The lower end of the front yoke unit 176 carries a working pawl or dog 179 biased toward engagement with teeth 181 formed on the wheel 177. An upper locking pawl 182, secured by a mount 183 (FIG. 1) to the side wall 32, is biased into locking engagement with the teeth 181. Thus, referring to FIGS. 1, 2 and 5–7, it may readily be seen that rotation of the eccentric 168 in a clockwise direction as viewed, results in reciprocation of the front drive arm 172 and the front yoke unit 176 to move the dog 179 clockwise into driving engagement with the conveyor front drive wheel 177. The clockwise rotation of the wheel 177, transmitted through the shaft 180 (FIG. 2) would therefore result in movement of top flights 184 (FIG. 20) of the conveyor 78 forwardly over the bottom wall 33 and toward the front gate 37.

Drive imparted to the rear drive connecting links 173a and 173b (FIGS. 1 and 2), pivotally interconnected at 186 to a pivot rod 187 suspended from a side wall 32, is transmitted to the lower end of a rear yoke unit 188, to which the rear of the link 173b is pivotally connected. The unit 188 is mounted in a straddling relation with a rear ratchet wheel 189 secured to an extension 191 (FIG. 2) of a rear sprocket shaft 88 for the conveyor 78. The lower end of the rear yoke unit 188 carries a pivoted pawl or dog 193 (FIG. 6) adapted upon pivotal reciprocation of the rear yoke unit 188 about the shaft extension 191 to engage the teeth 194 of the rear ratchet wheel 189 and rotates the wheel 189 counterclockwise as viewed in FIGS. 1, 2, 6 and 7. A locking pawl 196 is mounted above the wheel 189 to prevent reverse or clockwise rotation thereof. By this arrangement, conversely to the front ratchet wheel 177 wherein rotation of the eccentric 168 resulted in clockwise rotation of the wheel 177, the same rotation of the eccentric 168 results in counterclockwise rotation of the rear ratchet wheel 189 to move the conveyor top flights 184 rearwardly over the bottom wall 33 and toward the rear gate 38.

To control the direction of movement of the conveyor 78, control linkage is provided. At the front of the vehicle 30 and within reach of an operator (not shown) on the seat of the tractor to which the vehicle is connected, a lever 197 (FIGS. 1 and 5–7) is pivotally connected to a control indicating plate 198 secured to a stationary arm 199 mounted on the front of the container 31. The plate 198 is provided with a set 201 of four spaced openings adjacent the mark "F," and another set 202 of four spaced openings adjacent the mark "R." Another opening 203 is formed in the plate between the sets 201 and 202. A lug (not shown) on the lever 197 is selectively engageable in each of the openings, and as will be seen hereinafter, the position of the lever 197 on the plate 198 controls the speed and direction of the conveyor 78.

Pivotally connected to the lever 197 (FIG. 1) is a connector 204 connected at its lower end to a rock arm 206 secured to a shaft 207 having another rock arm 208 secured to the outer end thereof. A clevis 209 is pivotally connected at one end to the rock arm 208 and at the other end to the front end 211 of a connector rod 212. The rear end 213 (FIG. 15) of the rod 212 is formed with a yoke 214 for straddling the rear gate lever 67. Intermediate the ends of the rod 212 (FIG. 5), a pair of front and rear clutch plates 216 and 217, respectively, are rotatably mounted behind the front and rear ratchet wheels 177 and 189 on the shaft extensions 178 and 191.

Each clutch plate 216 and 217 (FIGS. 5, 6 and 7) is formed with diagonally opposed fan-shaped, upper and lower wings 218 and 219 having arcuate flanges 221 and 222 formed at their circumferential ends. When mounted as described hereinbefore, and wherein the upper wings 218 are pivotally connected to the connector rod 212 so as to be rotated thereby, each upper flange 221, disposed over the teeth of the respective ratchet wheels, is adapted to be moved between the locking pawls 182 and 196 and the teeth. Additionally, the lower flanges 222, also extended

mounted on said box for moving said conveyor toward said front end gate, second rotatable means having a second ratchet wheel mounted on said box for moving said conveyor toward said rear end gate, drive means including a pair of pawls each of which is engageable with one of said ratchet wheels for rotation thereof in opposite directions, and linkage means including a pair of clutch plates each of which is movable from a first position disengaging a corresponding pawl from a ratchet wheel to a second position removed from a corresponding pawl thereby enabling said corresponding pawl to engage a ratchet wheel, said linkage means movable between positions where one clutch plate is in a first position and the other clutch plate is in a second position, and vice versa.

3. A material unloading vehicle comprising a box having a bottom wall, side walls, a front end gate movable between open and closed positions, a rear end gate movable between open and closed positions, a conveyor supported on said box for reversible movement longitudinally over said bottom wall to move material to be unloaded selectively toward each end gate, means for controlling the movement of said conveyor including first rotatable means mounted on the front of said box for moving said conveyor toward said front end gate, second rotatable means mounted on the rear of said box for moving said conveyor toward said rear end gate, drive means operably and concurrently engageable with each said first and second rotatable means for transmitting rotation thereto, clutch means operable in one position to disengage said drive means from said first rotatable means while engaging said drive means to said second rotatable means to move said conveyor toward said rear end gate, said clutch means including mechanical means operatively connected to said rear end gate for unlatching said end gate from said box when said clutch means is in said one position.

4. A material unloading vehicle comprising a box having a bottom wall, side walls, a front end gate movable between open and closed positions, a rear end gate movable between open and closed positions, a conveyor supported on said box for reversible movement longitudinally over said bottom wall to move material to be unloaded selectively toward each end gate, mechanical means mounted on said box for latching and unlatching said rear end gate from said box, and means for controlling the movement of said conveyor including first rotatable means having a first ratchet wheel mounted on said box for moving said conveyor toward said front end gate, second rotatable means having a second ratchet wheel mounted on said box for moving said conveyor toward said rear end gate, drive means including a pair of pawls each of which is engageable with one of said ratchet wheels for rotation thereof in opposite directions, and linkage means including a pair of clutch plates each of which is movable from a first position disengaging a corresponding pawl from a ratchet wheel to a second position removed from a corresponding pawl thereby enabling said corresponding pawl to engage a ratchet wheel, said linkage means movable between positions where one clutch plate is in a first position and the other clutch plate is in a second position, and vice versa, said linkage means including a member connected to said mechanical means for unlatching said rear end gate when said linkage means is in a position with the pawl for the second ratchet wheel engageable therewith to move said conveyor toward said rear end gate.

References Cited by the Examiner

UNITED STATES PATENTS

| | | | |
|---|---|---|---|
| 307,904 | 11/84 | Bing | 198—216 X |
| 1,073,425 | 9/13 | Lambert | 198—216 X |
| 2,375,063 | 5/45 | Andershock | 214—83.18 |
| 2,462,404 | 2/49 | Kahres et al. | 214—83.18 |
| 2,496,463 | 2/50 | Gaddis | 214—83.36 |
| 2,505,731 | 4/50 | Dear | 214—519 X |
| 2,661,105 | 12/53 | Purdy | 214—83.26 |
| 2,676,002 | 4/54 | Wolfe | 214—519 X |
| 2,694,599 | 11/54 | Porter | 298—17.7 |
| 2,750,059 | 6/56 | Hintz | 214—519 X |
| 2,771,203 | 11/56 | Collins | 214—519 |
| 2,772,796 | 12/56 | Hansen | 214—83.14 |
| 2,788,927 | 4/57 | Hoffstetter | 222—415 |
| 2,797,795 | 7/57 | West | 198—110 X |
| 2,870,874 | 1/59 | Politte | 188—67 |
| 3,032,806 | 5/62 | Mallory | 188—67 X |
| 3,036,722 | 5/62 | Sharaway | 214—83.36 |
| 3,047,173 | 7/62 | Raney | 214—519 |

HUGO O. SCHULZ, *Primary Examiner.*

MORRIS TEMIN, *Examiner.*